United States Patent
Terrace et al.

(10) Patent No.: US 12,261,530 B2
(45) Date of Patent: Mar. 25, 2025

(54) SYNCHRONOUS DC-DC POWER CONVERTER WITH A SINGLE POWER STORAGE ELEMENT

(71) Applicant: REDARC TECHNOLOGIES PTY LTD., Morphett Vale (AU)

(72) Inventors: Donald Murray Terrace, Highgate (AU); Jordan Michael Hao-Jin Kilmartin, Morphett Vale (AU); Igor Abramov, Woodcroft (AU); Luke Woolcock, Morphett Vale (AU)

(73) Assignee: REDARC TECHNOLOGIES PTY LTD [AU/AU] (AU)

( * ) Notice: Subject to any disclaimer, the term of this patent is extended or adjusted under 35 U.S.C. 154(b) by 261 days.

(21) Appl. No.: 18/023,794

(22) PCT Filed: Aug. 24, 2021

(86) PCT No.: PCT/AU2021/050954
§ 371 (c)(1),
(2) Date: Feb. 28, 2023

(87) PCT Pub. No.: WO2022/056576
PCT Pub. Date: Mar. 24, 2022

(65) Prior Publication Data
US 2023/0318457 A1    Oct. 5, 2023

(30) Foreign Application Priority Data
Sep. 18, 2020 (AU) ................................ 2020903355

(51) Int. Cl.
*H02M 3/158* (2006.01)
*H02M 1/00* (2006.01)

(52) U.S. Cl.
CPC ........... *H02M 3/158* (2013.01); *H02M 1/009* (2021.05); *H02M 3/1582* (2013.01); *H02M 1/0054* (2021.05)

(58) Field of Classification Search
CPC ............. H02M 1/0003; H02M 1/0009; H02M 1/0022; H02M 1/0048; H02M 1/0054;
(Continued)

(56) References Cited

U.S. PATENT DOCUMENTS 6,788,033 B2    9/2004 Vinciarelli
10,476,390 B2 *  11/2019 Petersen ............. H02M 1/0095
(Continued)

FOREIGN PATENT DOCUMENTS

DE    102019118678    1/2020
KR    101168078       7/2012
(Continued)

OTHER PUBLICATIONS

Alireza Khaligh; "A multiple-input dc-dc positive buck-boost converter topology"; May 16, 2008; IEEE; 2008 Twenty-Third Annual IEEE Applied Power Electronics Conference and Exposition (Year: 2008).*
(Continued)

*Primary Examiner* — Thienvu V Tran
*Assistant Examiner* — Shahzeb K Ahmad
(74) *Attorney, Agent, or Firm* — Fish & Richardson P.C.

(57) ABSTRACT

The present invention relates to a synchronous DC-DC power converter which may include a conversion cell including a number of switches and a single inductor, and a controller. The controller is configured to control a cycle of conversion of the conversion cell of the converter with multiple phases by controlling each of the switches.

19 Claims, 5 Drawing Sheets

(58) Field of Classification Search
CPC .......... H02M 1/009; H02M 1/10; H02M 1/38; H02M 3/155; H02M 3/156; H02M 3/158; H02M 3/1582; H02M 3/1584; H02M 3/1586; H02M 3/1588
See application file for complete search history.

(56) References Cited

U.S. PATENT DOCUMENTS

| | | | | |
|---|---|---|---|---|
| 11,205,947 | B2* | 12/2021 | Chen | H02M 3/33592 |
| 11,817,725 | B2 | 11/2023 | Delano et al. | |
| 11,848,564 | B2* | 12/2023 | Jung | H02J 50/12 |
| 2004/0239299 | A1 | 12/2004 | Vinciarelli | |
| 2005/0264271 | A1* | 12/2005 | Lam | H02M 1/10 |
| | | | | 323/282 |
| 2010/0148587 | A1* | 6/2010 | Khaligh | H02M 3/1582 |
| | | | | 307/72 |
| 2012/0153729 | A1 | 6/2012 | Song et al. | |
| 2018/0159426 | A1 | 6/2018 | Vinciarelli | |
| 2020/0021190 | A1* | 1/2020 | Delano | H02J 7/0013 |

FOREIGN PATENT DOCUMENTS

| | | |
|---|---|---|
| WO | WO 2018183595 | 10/2018 |
| WO | WO 2020114630 | 6/2020 |
| WO | WO 2022056576 | 3/2022 |

OTHER PUBLICATIONS

Extended European Search Report in European U.S. Appl. No. 21/867,933, dated Oct. 9, 2024, 12 pages.

International Search Report and Written Opinion in International Appln. No. PCT/AU2021/050954, mailed on Sep. 8, 2021, 9 pages.

Jung et al., "Time Slot Optimization Algorithm for Multisource Energy Harvesting Systems," ESSCIRC Conference 2016: 42nd European Solid-State Circuits Conference, Lausanne, Switzerland, Sep. 12-15, 2016, 4 pages.

Khaligh, "A multiple-input dc-dc positive buck-boost converter topology," 2008 Twenty-Third Annual IEEE Applied Power Electronics Conference and Exposition, TX, USA, Feb. 24-28, 2008, 1522-1526.

Wang et al., "Single-Inductor Dual-Input Triple-Output Buck-Boost Converter with Clockless Shortest Power Path Control Strategy for IoT Nodes," IEEE Transactions on Power Electronics, Feb. 2019, 35(2):2044-2052.

Xian et al., "Exact steady-state analysis in multiple-input converters applied with diverse time-sharing switching schemes," IET Power Electron, May 2015, 8(5):724-734.

Zheng et al., "A Single-Inductor Multiple-Output Auto-Buck-Boost DC-DC Converter with Autophase Allocation," IEEE Transactions on Power Electronics, Mar. 2016, 31(3):2296-2313.

* cited by examiner

SYNCHRONOUS DC-DC POWER CONVERTER WITH A SINGLE POWER STORAGE ELEMENT

CROSS-REFERENCE TO RELATED APPLICATIONS

This application is a National Stage Application under 35 U.S.C. § 371 and claims the benefit of International Application No. PCT/AU2021/050954, filed Aug. 24, 2021, which is the country equivalent to AU patent application No. 2020903355, filed on Sep. 18, 2020, the entire contents of each are incorporated herein by reference in their entirety.

TECHNICAL FIELD

The present invention relates to a synchronous DC-DC power converter.

In particular, but not exclusively, the synchronous DC-DC power converter includes a conversion cell including a number of switches and a single inductor, and a controller. The controller is configured to control a cycle of conversion of the conversion cell of the converter with multiple phases by controlling each of the switches.

BACKGROUND OF INVENTION

The use of DC-DC power converters is becoming increasingly widespread in electrical products, such as portable computers and mobile devices. In many cases, the performance of a product depends on the efficiency of the power converter.

Further, it is also becoming increasingly widespread for electrical products to be powered by multiple power sources, such as a solar panel and a battery. For these products, a multiple input power converter may be used to provide consistent and reliable voltage from the multiple power sources. To provide consistent and reliable voltage, existing multiple input power converters typically enable only one of the power sources to transfer energy at a time. These existing converters can thus enable electrical products to be powered from a variety of different types of power sources. Each of these power sources will have different characteristics so that they can provide for optimum power delivery to the electrical products in different scenarios. Accordingly, electrical products powered in this manner can thus be made to be more reliable, efficient and economical than if they were powered by only one type of power source. Nonetheless, electrical products could be made to be even more reliable, efficient and economical if they were able to be powered by multiple power sources at the same time.

One existing multiple input power converter that enables the combining of different power sources at the same time to power an electrical product is described in U.S. Pat. No. 8,853,888 "Multiple-input DC-DC converter". In this patent, a multiple input power converter is capable of combining different energy sources with different voltage-current characteristics. More specifically, this multiple input power converter is capable of operating bidirectionally in buck, boost and buck-boost modes.

The control system of U.S. Pat. No. 8,853,888, however, has a number of limitations that could be improved to improve at least the efficiency of the converter. For example, U.S. Pat. No. 8,853,888 cannot boost from multiple sources, and the control system is only capable of running either buck or boost in each cycle or the power converter.

It is therefore desirable to provide an efficient multiple input power converter with greater capabilities, less parts, less size, less heat that is generated in use, and with improved switching control between different power sources.

A reference herein to a patent document or other matter which is given as prior art is not to be taken as an admission that that document or matter was known or that the information it contains was part of the common general knowledge in Australia or elsewhere as at the priority date of any of the disclosure or claims herein. Such discussion of prior art in this specification is included to explain the context of the present invention in terms of the inventor's knowledge and experience.

SUMMARY OF INVENTION

In one aspect of the present invention, there is provided a synchronous DC-DC converter including: a first converter input including a first input voltage that is electrically connected to a first bidirectional switch; a second converter input including a second input voltage that is electrically connected to a second bidirectional switch; a power storage element; a third switch, wherein an output of the first converter input and or the second converter input is electrically connected to an input of the power storage element and to the third switch, the third switch is connected to a ground; a fourth switch; a fifth switch; a converter output including an output voltage, wherein the output of the power storage element is connected to the fourth switch and to the fifth switch, the fourth switch is connected to the ground and the fifth switch is connected to the converter output in connection with a capacitor; and a controller configured to control a cycle of conversion of the DC-DC converter with multiple phases by controlling each of the switches, where: at least one boost phase has one of the first and second bidirectional switches ON to connect to the input of the power storage element, and the fourth switch ON to connect the output of the power storage element to the ground while all other switches are OFF; at least one through phase has one of the first and second bidirectional switches ON to connect to the input of the power storage element, and the fifth switch ON to connect the output of the power storage element to the converter output while all other switches are OFF; and at least one buck phase has the third switch ON to connect the ground to the input of the power storage element, and the fifth switch ON to connect the output of the power storage element to the converter output while all other switches are OFF.

Preferably, the power sources are low-voltage power sources, such as a battery and a solar panel. The above synchronous DC-DC converter makes efficient use of these low-voltage power sources using a single power storage element such as an inductor. This is advantageous when combining power from multiple power sources as one or more of the sources may have power or voltage limitations that are independent of each other and of the output voltage. For example, supply may come from a solar panel at a higher voltage for maximum efficiency, and from a smart vehicle alternator that is regulating to a voltage lower than the converter output voltage. Alternatively, two solar panels of different sizes/locations can be regulated for maximum efficiency and used as power sources by the above converter.

Also, the above synchronous DC-DC converter allows efficiency gains and weight improvements. Preferably, the converter is a multi-input single-inductor synchronous switch-mode DC-DC power converter that combines the buck and boost steps/phases within a single cycle of the power converter.

Further, embodiments of the above synchronous DC-DC converter allow for efficiency improvements by: not requiring diodes on the converter inputs, since the switching cycles of the converter are fully interleaved; and controlling the phases of the switching cycles by the controller.

This combination of features in the various embodiments allow the size and weight of the synchronous DC-DC converter to be reduced relative to traditional multiple input buck-boost power converters, of the type described above, by eliminating electrical components from the converter, such as further inductors and switches. These further inductors and switches would otherwise be needed to, for example, boost voltage on the converter inputs that can go below output voltage. Also, by eliminating electrical components, the amount of heatsinking that would otherwise be required to remove heat from these components is minimised.

In an embodiment, the controller is configured to order the phases of the cycle of conversion as: the at least one boost phase, the at least one through phase, and then the at least one buck phase.

In an embodiment, the at least one boost phase includes a first boost phase for the first converter input where the first bidirectional switch is ON to connect to the input of the power storage element, and the fourth switch is ON to connect the output of the power storage element to the ground while all other switches are OFF, and a second boost phase for the second converter input where the second bidirectional switch is ON to connect to the input of the power storage element, and the fourth switch is ON to connect the output of the power storage element to the ground while all other switches are OFF.

Further, the at least one through phase includes a first through phase where the first bidirectional switch is ON to connect to the input of the power storage element, and the fourth switch is ON to connect the output of the power storage element to the ground while all other switches are OFF, and a second through phase where the second bidirectional switch is ON to connect to the input of the power storage element, and the fourth switch is ON to connect the output of the power storage element to the ground while all other switches are OFF.

In the embodiment with multiple boost and through phases, the controller may group the first and second boost phases together in the cycle of conversion of the DC-DC converter so the fifth switch is changed only twice in the cycle. Alternatively, or in addition, the controller groups the first and second through phases together in the cycle of conversion of the DC-DC converter so the third switch is changed only twice in the cycle. The controller may also select the first through phase in the cycle of conversion to use the same one of the first and second converter inputs used in a buck phase of a previous cycle. The controller is thus used to optimise the switching sequence to reduce the number of switching events for each switch, thereby decreasing switching losses and improving efficiency.

In the embodiment with multiple boost and through phases, the controller may instead alternate the first and second boost phases with the first and second through phases in the cycle of conversion of the DC-DC converter if the output voltage is below either of the first or second input voltages.

In an embodiment, the controller adds additional buck phases after the first and second boost phases, respectively, in the cycle of conversion of the DC-DC converter if either first or second input voltage is above the output voltage.

In another embodiment of the synchronous DC-DC converter, the converter further includes a further converter output including a further output voltage, wherein the output of the power storage element is additionally connected to a sixth switch, the sixth switch is connected to the further converter output in connection with a capacitor. The controller is further configured to control each of the switches where the at least one through phase has the fifth switch and then the sixth switch ON sequentially, and the at least one buck phase has the fifth switch and then the sixth switch ON sequentially.

In an embodiment, the synchronous DC-DC converter is configured to operate in Discontinuous Conduction Mode (DCM), and the synchronous DC-DC converter includes a DCM phase which has the third switch or the fifth switch ON while all other switches are OFF. In this embodiment, the controller is configured to order the phases of the cycle of conversion as: the at least one boost phase, the at least one through phase, the at least one buck phase, and then the DCM phase.

In an embodiment, the controller operates the DC-DC converter bidirectionally to provide the output voltage to one of the first or second converter inputs.

In an embodiment, the synchronous DC-DC converter further includes a plurality of conversion cells, each of the conversion cells including: the first converter input, the first bidirectional switch, the second converter input, the second bidirectional switch, the power storage element, the third switch, the fourth switch, the fifth switch, and the converter output. These cells may be configured in different configurations. For example, the conversion cells are connected in parallel to increase current capacity of the converter.

In another aspect of the present invention, there is provided a method of controlling the above synchronous DC-DC converter including: receiving input measurements from the first converter input and the second converter input at the controller; the controller calculating cycles of conversion of the DC-DC converter based on at least the input measurements; and the controller generating Pulse Width Modulation (PWM) settings to control switching of each of the switches to control the cycles of conversion of the DC-DC converter.

In addition, the method may further include the controller calculating the cycles of conversion of the DC-DC converter based on one or more of: input constraints associated with the first and second converter inputs; output constraints associated with the converter output; output measurements from the converter output;

and a maximum current of the power storage element constraint.

BRIEF DESCRIPTION OF DRAWINGS

A preferred embodiment of the present invention will now be described with reference to the accompanying drawings wherein.

DETAILED DESCRIPTION

Figure 1:
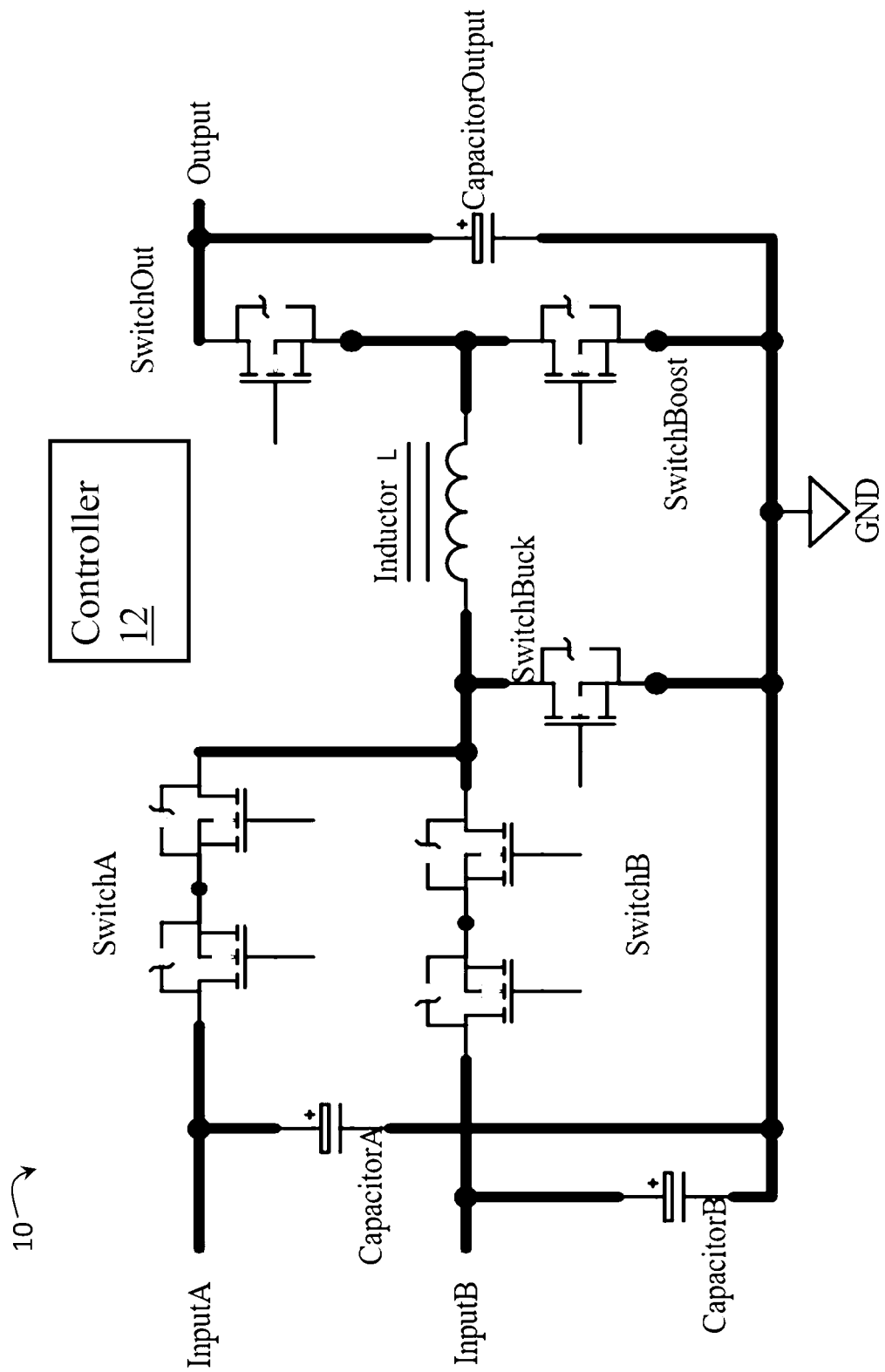
FIG. 1 is a circuit topology diagram of a synchronous DC-DC power converter according to an embodiment of the present invention.

A synchronous DC-DC power converter 10 according to an embodiment is shown in FIG. 1. The synchronous DC-DC power converter 10 ("the converter") includes a first converter input InputA including a first input voltage that is electrically connected to a first bidirectional switch SwitchA and a second converter input InputB including a second input voltage that is electrically connected to a second bidirectional switch SwitchB. In alternative embodiments, there are N converter inputs InputN electrically connected to bidirectional switches, respectively.

The DC-DC converter 10 further includes a power storage element, in the form of a single inductor L, and a third switch SwitchBuck, where an output of the first converter input InputA and the second converter input InputB is electrically connected to an input of the inductor L and to the third switch SwitchBuck, and the third switch SwitchBuck is connected to a ground. The output of the inductor L is connected to a fourth switch SwitchBoost and to a fifth switch SwitchOut. The fourth switch SwitchBoost is connected to the ground and the fifth switch SwitchOut is connected to a converter output Output in connection with a capacitor CapacitorOutput. The converter output Output includes an output voltage. The converter 10 thus converts power from two input sources having two input voltages to an output voltage to supply the output voltage to a device. In alternative embodiments, there are N converter outputs OutputN electrically connected to a switch and a capacitor, respectively.

The converter 10 is controlled by a controller 12. The controller 12 is configured to control a cycle of conversion of the DC-DC converter with multiple phases by controlling each of the described switches SwitchA SwitchB SwitchBuck SwitchBoost SwitchOut. That is, the controller 12 is configured to apply a modulation technique for the converter 10.

In an embodiment, the controller 12 is a digital controller, implemented on a processor (e.g. STM32F334 line). It will be appreciated by those persons skilled in the art that alternative embodiments may implement this controller on other microcontrollers, FPGAs, mixed-signal SoCs, or even analogue devices. The control output from the microcontroller is done via a built-in PWM generator, which is then externally boosted to provide suitable control signals for each of the switches SwitchA SwitchB SwitchBuck SwitchBoost SwitchOut.

In an embodiment, individual voltage sensors are implemented for each converter input InputA InputB, each consisting of voltage dividers with filtering to reduce noise while maintaining the required converter bandwidth.

In an embodiment, the converter 10 includes one or more switch mode power conversion cells, each cell including the switches, power storage element, inputs and outputs. The controller 12 may control a plurality of such conversion cells. Each input and output of each cell has a voltage and/or current sensor, with measurements of the sensors being fed to the controller 12.

In an embodiment, there is one shunt current sensor on the output of a conversion cell, from which all currents are estimated. In alternative embodiments, there may be additional current sensors on the inputs. In another embodiment, a Hall-effect or magneto-resistive current sensor may instead be used. In yet another embodiment, the $V_{DS}$ of the switches may be measured, and an estimate of $R_{DS,ON}$ may be used to estimate current.

As mentioned, each conversion cell includes switches, inputs, outputs and a power storage element that is used to move energy from the input to the output. The storage element also has switches connecting it to a ground reference and to the output. For an embodiment with low DC voltages on both input and output, the switches are hard-switched MOSFETs. Where necessary (due to intrinsic body diodes of power MOSFETS), back-to-back MOSFET pairs with a common gate signal are used to block reverse current.

The controller 12 is configured to run the converter 10 for a plurality of cycles each with multiple phases. Each cycle will include each of the phases listed below. In some embodiments, multiple instances of the phases may occur in a single cycle.

With reference to FIG. 1, there is a boost phase, which has one of the first and second bidirectional switches SwitchA SwitchB ON to connect to the input of the inductor L, and the fourth switch SwitchBoost ON to connect the output of the inductor L to the ground while all other switches are OFF.

A through phase, which has one of the first and second bidirectional switches SwitchA SwitchB ON to connect to the input of the inductor L, and the fifth switch SwitchOut ON to connect the output of the inductor L to the converter output Output while all other switches are OFF.

A buck phase, which has the third switch SwitchBuck ON to connect the ground to the input of the inductor L, and the fifth switch SwitchOut ON to connect the output of the inductor L to the converter output Output while all other switches are OFF.

In the embodiment shown in FIG. 1, the converter 10 includes a power storage element in the form of the single inductor L, and there are at two inputs. An alternative embodiment may use two or more equivalent conversion cells in parallel controlled by the controller 12 to increase current capacity. In such an embodiment, current balancing between the two cells may be required.

Figure 4:
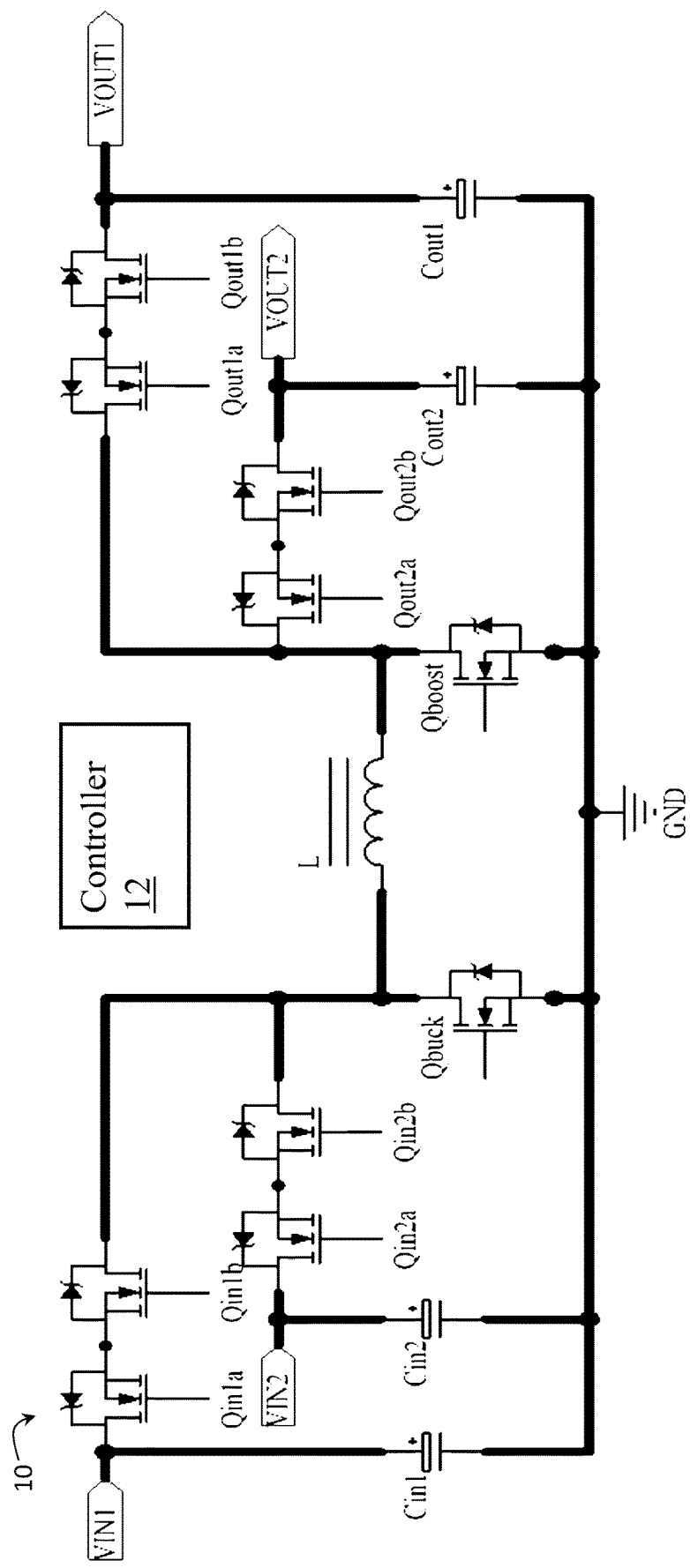
FIG. 4 is a circuit topology diagram of a synchronous DC-DC power converter according to an embodiment of the present invention.

FIG. 4 shows an alternative embodiment of the converter 10 with multiple inputs and multiple outputs. Specifically, the converter 10 here includes a first converter input including a first input voltage VIN1 that is electrically connected to a first bidirectional switch Qin1a Qin1b and a second converter input including a second input voltage VIN2 that is electrically connected to a second bidirectional switch Qin2a Qin2b. The converter 10 further includes a single inductor L, and a third switch Qbuck, where an output of the first converter input and the second converter input is electrically connected to an input of the inductor L and to the third switch Qbuck, and the third switch Qbuck is connected to a ground. The output of the inductor L is connected to a fourth switch Switch Boost, and to a fifth switch Qout1a Qout1b and a sixth switch Qout2a Qout2b. The fourth switch SwitchBoost is connected to the ground and the fifth switch Qout1a Qout1b and the sixth switch Qout2a Qout2b are connected to the multiple converter outputs, respectively, each in connection with capacitors Cout1 Cout2. Each converter output may thus have a different output voltage VOUT1 VOUT2.

In FIG. 4, it can be seen that back to back MOSFET pairs are used as switches for each output. In this embodiment, with the controller 12 controlling the cycles of the converter 10 as described, there is no need for a recirculating switch on the inductor L.

Figure 2:
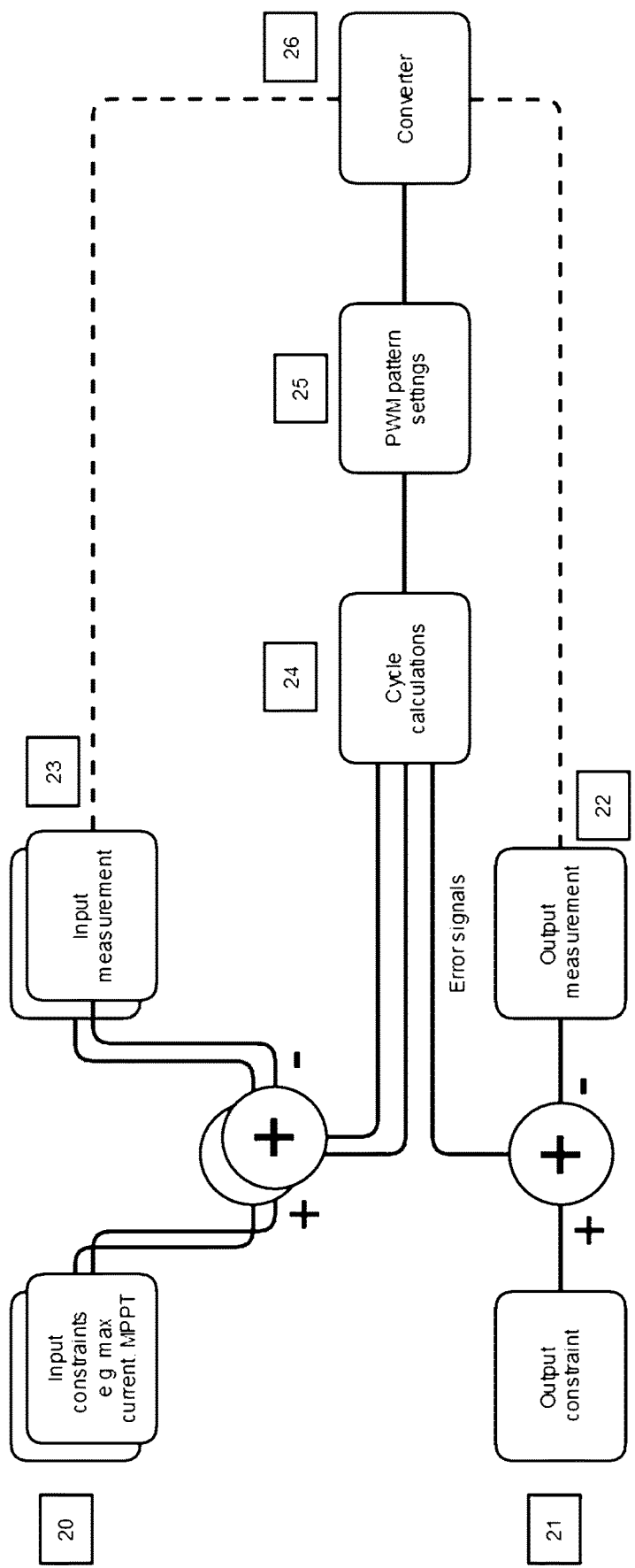
FIG. 2 is a diagram showing control of a synchronous DC-DC power converter according to an embodiment of the present invention.

FIG. 2 is a diagram showing control of a converter 10 according to an embodiment of the present invention. A set of constraints 20 21 is first stored or calculated relating to each input and to an output of the converter 10. Estimates of actual values 22 23 are made from measurements and compared to the control parameters to create error estimates. The error estimates will then be used to calculate cycle times 24, of the converter 10, which will then be used to generate a switching pattern for a PWM generator 25, which is used to control a conversion cell 26.

This will then perturb the input and output voltages, making a feedback control system. In an embodiment with multiple parallel cells 26, a separate control loop for each cell may allow for component variation between cells.

In an embodiment, the controller 12 may be configured to track the measured voltage/current against a target voltage or current of a maximum power point tracker (MPPT) as suitable for a solar panel, or a simple set of voltage and current limits as suitable for a battery input. That is, the controller 12 additionally controls the inputs to configure them to be suitable for voltage limiting, current limiting, or MPPT, allowing use of solar panels, batteries and vehicle alternators as inputs.

In this embodiment, the controller 12 may be configured to control the converter 10 to either output a constant voltage (e.g. for a stable supply) or a battery charging profile with voltage and current limits. Alternative embodiments may also output a current limited output for LED string control.

In an alternate embodiment with multiple parallel conversion cells, the target output current could be divided between the two cells with a control system for each cell receiving a portion of the current as its target value.

The embodiments may also have additional high-level controls for safety, efficiency, and reliability, such as shutting off under low supply conditions, derating at higher temperatures, or cut-off in short circuit output conditions. For example, in the embodiment with multiple parallel cells, only one cell may be run at low currents, to reduce switching losses and increase efficiency.

Figure 3:
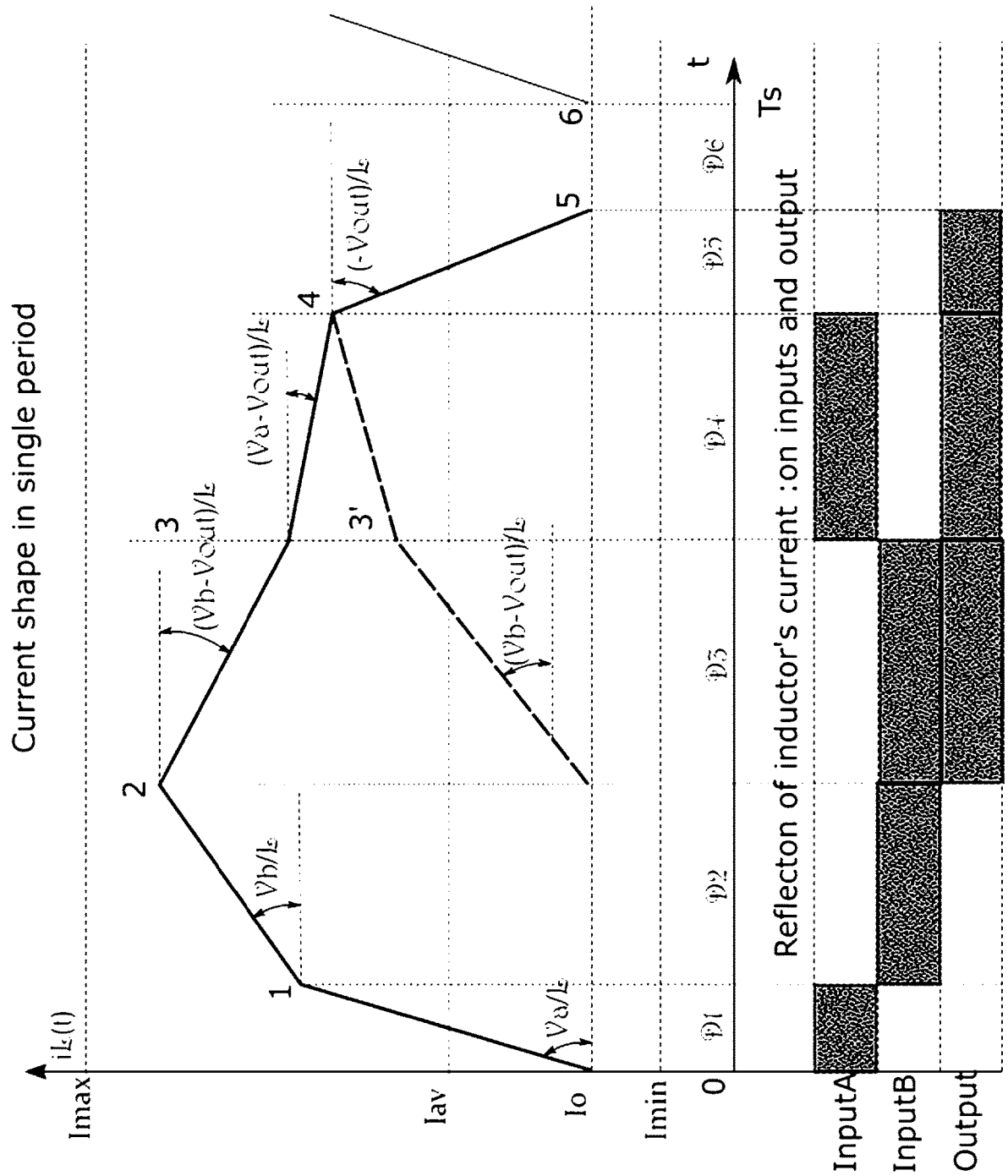
FIG. 3 is a diagram showing current in a conductor of a synchronous DC-DC power converter according to an embodiment of the present invention.

The control method involves cycle calculation 24 and PWM setting 25. As mentioned, the PWM outputs will be configured to run in cycles each with multiple phases. FIG. 3 shows an example of a cycle with two inputs and one output. FIG. 4 shows an example with multiple outputs. In FIG. 4, the through phases and buck phase involves the output switches being turned one sequentially, one at a time.

An example of a cycle with two inputs and one output is shown in FIG. 3 and explained below. The switching sequence for one cycle is configured as a set of phases (D1-D5), with a possible rest phase (D6) if the converter 10 is operating in discontinuous conduction mode (DCM). The converter 10 normally operates in continuous conduction mode (CCM) but may operate in DCM under certain circumstances, such as when there are light loads connected to the output.

D1 is a boost phase for input A: the inductor current will increase with slope $$\frac{dI_L}{dt} = \frac{V_a}{L}.$$

In this boost phase D1:
the output is not connected (SwitchOut of FIG. 1 disconnected),
the output end of the inductor is connected to ground (SwitchBoost on),
only the input switch SwitchA is on, and
SwitchBuck is OFF.

D2 is a boost phase for input B: the inductor current will increase with slope $$\frac{dI_L}{dt} = \frac{V_b}{L}.$$

In this boost phase D2:
the output is not connected (SwitchOut of FIG. 1 disconnected),
the output end of the inductor is connected to ground (SwitchBoost on),
only the input switch SwitchB is on, and
SwitchBuck is OFF.

D3 is a through phase for input B: the inductor current will increase with potentially negative slope $$\frac{dI_L}{dt} = \frac{V_b - V_{out}}{L}.$$

In this through phase:
the output is connected (SwitchOut of FIG. 1 connected),
the output end of the inductor is disconnected from ground (SwitchBoost OFF),
only the input switch SwitchB is on, and
SwitchBuck is OFF.

In the solid line passing through point 3, the output voltage is higher than either input voltage and the voltage on input A is higher than input B.

D4 is a through phase for input A: the inductor current will increase with potentially negative slope $$\frac{dI_L}{dt} = \frac{V_a - V_{out}}{L}.$$

In this through phase:
the output is connected (SwitchOut of FIG. 1 connected),
the output end of the inductor is disconnected from ground (SwitchBoost OFF),
only the input switch SwitchA is on, and
SwitchBuck is OFF.

D5 is a buck phase: the inductor current will decrease with slope $$\frac{dI_L}{dt} = \frac{-V_{out}}{L}.$$

In this Buck phase,
all input switches (SwitchA and SwitchB) are OFF,
SwitchBoost is OFF,
SwitchOut is on, and
SwitchBuck is on.

The DCM phase D6 may be entered immediately before the inductor current will cross zero. In this phase, any remaining inductor current will pass through the intrinsic diodes of the switches before stopping. In an embodiment, one of either the output switch or the buck switch will be left on to reduce diode losses. Alternative embodiments with multiple outputs should turn an output switch on and leave the buck switch OFF for DCM.

As mentioned, embodiments of the converter 10 may use DCM phases when operating at light load. Alternative embodiments may run the converter 10 intermittently at light load to avoid continuous conduction mode (CCM) inductor losses.

In an embodiment, the order of phases of the converter 10 is arbitrary for the method other than the DCM phase D6 (if used). In other embodiments, the switching sequence is optimised to reduce the number of switching events for each switch, thereby decreasing switching losses and improving efficiency.

This is done by:
grouping the boost steps so that the output switch is changed only twice per cycle,
grouping the through steps so that the buck switch is changed only twice per cycle, and/or
choosing the first through step to use the same input as the previous buck step.

An alternative embodiment may re-order the steps to optimise peak-to-average magnetic flux ratio in the inductor, thereby reducing the required inductor saturation current and hence improving at least one of efficiency or size. This may be done by:
alternating boost and through steps if the output voltage is below input voltages, or
adding extra buck steps to the cycle, to be inserted after each boost step, and after through steps for inputs at a higher voltage than the output.

Even with these switch ordering improvements, the converter 10 must ensure that the peak and RMS current in the inductor do not exceed the ratings of the inductor L. This requirement, along with the target input and output currents and voltages will constrain the phase timings Initial calculations of the length of each part of the phase are performed by linear programming. Handling of error feedback is done by adjusting the relative length of phases based on filtered feedback.

In an alternative embodiment, more input switches may be added, with corresponding "boost" and "through" phases. The calculations for this embodiment will follow similar methods.

In the embodiment of FIG. 3, although D1/D2 may approach 0, shown in the dashed curve passing through point 3' of FIG. 3, at least one boost phase of some cycles (not necessarily consecutive) must have non-zero length in order to use a low-cost bootstrap type gate driver for SwitchOut. Alternative embodiments may allow these phases to reach 0 by using a separate gate supply.

Figure 5:
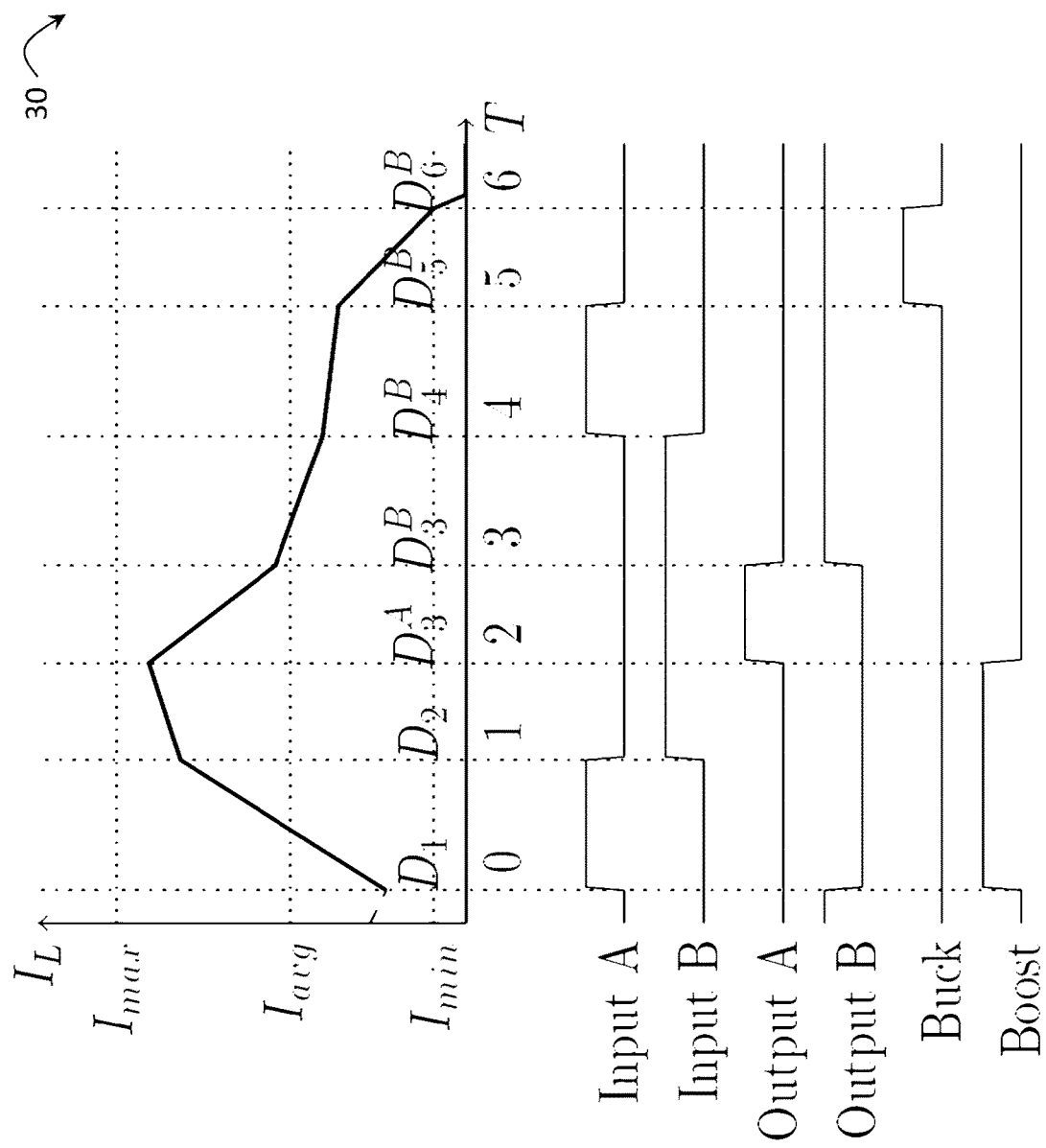
FIG. 5 is a diagram showing timing of one cycle of the DC-DC converter of FIG. 4 according to an embodiment of the present invention.

As mentioned, in an alternative embodiment more outputs may be added to the converter 10 such as in the embodiment of FIG. 4. An example switching sequence of a cycle of the converter 10 of FIG. 4 is shown in FIG. 5. Here, the switching sequence is distributed over through phases and buck phases based on the current requirements of each output.

More specifically, an example sequence is shown in FIG. 5 with the division of phase $D_3$ into two phases: $D_3^A$ and $D_3^B$. Depending on the current requirements of the two outputs, this division may occur in any of phases D3 through D6.

Error correction calculations may be done as often as each output cycle, but for lower bandwidth requirements, may be done at longer intervals, with the PWM device repeating the cycle as programmed until a new cycle is calculated.

In yet another embodiment, the converter 10 can be used in reverse, providing power from the output(s) to the inputs.

Figure 6:
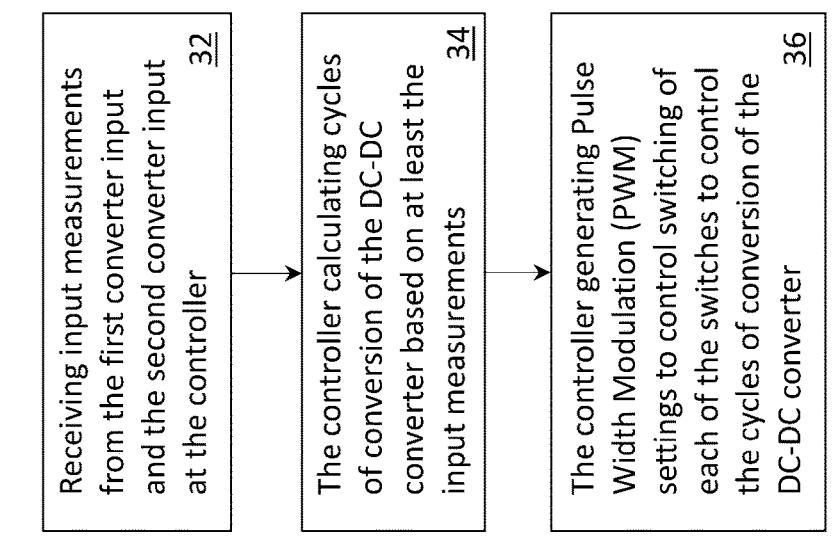
FIG. 6 is a flow chart showing a method of controlling the synchronous DC-DC power converter of FIG. 1.

FIG. 6 is a flow chart showing a method 30 of controlling the synchronous DC-DC power converter of FIG. 1 including the steps of: receiving 32 input measurements from the first converter input and the second converter input at the controller; the controller calculating 34 cycles of conversion of the DC-DC converter based on at least the input measurements; and the controller 36 generating Pulse Width Modulation (PWM) settings to control switching of each of the switches to control the cycles of conversion of the DC-DC converter.

The method may also involve the steps of receiving further inputs, such as input constraints, output constraints, and output measurements. The controller 12 thus calculates the cycles of conversion of the converter 10 based on the received input measurements and the further received values, as shown in the flow chart pf FIG. 2.

In addition, it will be appreciated by those persons skilled in the art that further aspects of the method 30 will be apparent from the above description of the converter 10. Further, the person skilled in the art will also appreciate that at least part of the method could be embodied in program code that is implemented by the controller 12. The program code could be supplied in a number of ways, for example on a memory (not shown).

Finally, it is to be understood that various alterations, modifications and/or additions may be introduced into the constructions and arrangements of parts previously described without departing from the spirit or ambit of the invention.

The invention claimed is:

1. The synchronous DC-DC converter including:
a first converter input including a first input voltage that is electrically connected to a first bidirectional switch;
a second converter input including a second input voltage that is electrically connected to a second bidirectional switch;
a power storage element;
a third switch, wherein an output of the first converter input and or the second converter input is electrically connected to an input of the power storage element and to the third switch, the third switch is connected to a ground;
a fourth switch;
a fifth switch;
a converter output including an output voltage, wherein the output of the power storage element is connected to the fourth switch and to the fifth switch, the fourth switch is connected to the ground and the fifth switch is connected to the converter output in connection with a capacitor; and
a controller configured to control a cycle of conversion of the DC-DC converter with multiple phases by controlling each of the switches, where:
at least one boost phase has one of the first and second bidirectional switches ON to connect to the input of the power storage element, and the fourth switch ON to connect the output of the power storage element to the ground while all other switches are OFF;
at least one through phase has one of the first and second bidirectional switches ON to connect to the input of the power storage element, and the fifth switch ON to connect the output of the power storage element to the converter output while all other switches are OFF; and at least one buck phase has the third switch ON to connect the ground to the input of the power storage element, and the fifth switch ON to connect the output of the power storage element to the converter output while all other switches are OFF.

2. The synchronous DC-DC converter of claim 1, wherein the controller is configured to order the phases of the cycle of conversion as: the at least one boost phase, the at least one through phase, and then the at least one buck phase.

3. The synchronous DC-DC converter of claim 1, wherein the at least one boost phase includes a first boost phase for the first converter input where the first bidirectional switch is ON to connect to the input of the power storage element, and the fourth switch is ON to connect the output of the power storage element to the ground while all other switches are OFF, and a second boost phase for the second converter input where the second bidirectional switch is ON to connect to the input of the power storage element, and the fourth switch is ON to connect the output of the power storage element to the ground while all other switches are OFF.

4. The synchronous DC-DC converter of claim 3, wherein the at least one through phase includes a first through phase where the first bidirectional switch is ON to connect to the input of the power storage element, and the fourth switch is ON to connect the output of the power storage element to the ground while all other switches are OFF, and a second through phase where the second bidirectional switch is ON to connect to the input of the power storage element, and the fourth switch is ON to connect the output of the power storage element to the ground while all other switches are OFF.

5. The synchronous DC-DC converter of claim 4, wherein the controller groups the first and second boost phases together in the cycle of conversion of the DC-DC converter so the fifth switch is changed only twice in the cycle.

6. The synchronous DC-DC converter of claim 4, wherein the controller groups the first and second through phases together in the cycle of conversion of the DC-DC converter so the third switch is changed only twice in the cycle.

7. The synchronous DC-DC converter of claim 6, wherein the controller selects the first through phase in the cycle of conversion to use the same one of the first and second converter inputs used in a buck phase of a previous cycle.

8. The synchronous DC-DC converter of claim 4, wherein the controller alternates the first and second boost phases with the first and second through phases in the cycle of conversion of the DC-DC converter if the output voltage is below either of the first or second input voltages.

9. The synchronous DC-DC converter of claim 4, wherein the controller adds additional buck phases after the first and second boost phases, respectively, in the cycle of conversion of the DC-DC converter if either first or second input voltage is above the output voltage.

10. The synchronous DC-DC converter of claim 1, further including a further converter output including a further output voltage, wherein the output of the power storage element is additionally connected to a sixth switch, the sixth switch is connected to the further converter output in connection with a capacitor.

11. The synchronous DC-DC converter of claim 10, wherein the controller is further configured to control each of the switches where the at least one through phase has the fifth switch and then the sixth switch ON sequentially, and the at least one buck phase has the fifth switch and then the sixth switch ON sequentially.

12. The synchronous DC-DC converter of claim 1, wherein the synchronous DC-DC converter is configured to operate in Discontinuous Conduction Mode (DCM), and the synchronous DC-DC converter includes a DCM phase which has the third switch or the fifth switch ON while all other switches are OFF.

13. The synchronous DC-DC converter of claim 12, wherein the controller is configured to order the phases of the cycle of conversion as: the at least one boost phase, the at least one through phase, the at least one buck phase, and then the DCM phase.

14. The synchronous DC-DC converter of claim 1, wherein the controller operates the DC-DC converter bidirectionally to provide the output voltage to one of the first or second converter inputs.

15. The synchronous DC-DC converter of claim 1, wherein the power storage element is an inductor.

16. The synchronous DC-DC converter of claim 1, further including a plurality of conversion cells, each of the conversion cells include: the first converter input, the first bidirectional switch, the second converter input, the second bidirectional switch, the power storage element, the third switch, the fourth switch, the fifth switch, and the converter output.

17. The synchronous DC-DC converter of claim 16, wherein the conversion cells are connected in parallel to increase current capacity of the converter.

18. A method of controlling the synchronous DC-DC converter of claim 1, the method including:
 receiving input measurements from the first converter input and the second converter input at the controller;
 the controller calculating cycles of conversion of the DC-DC converter based on at least the input measurements; and
 the controller generating Pulse Width Modulation (PWM) settings to control switching of each of the switches to control the cycles of conversion of the DC-DC converter.

19. The method of claim 18, further including the controller calculating the cycles of conversion of the DC-DC converter based on one or more of:
 input constraints associated with the first and second converter inputs;
 output constraints associated with the converter output;
 output measurements from the converter output; and
 a maximum current of the power storage element constraint.

* * * * *